Nov. 18, 1941.    F. HARVEY ET AL    2,263,211
ELECTRIC POWER DISTRIBUTION SYSTEM
Filed Oct. 10, 1938    2 Sheets-Sheet 1

Frank Harvey
Elmer T. Carlson
INVENTORS

BY
ATTORNEY

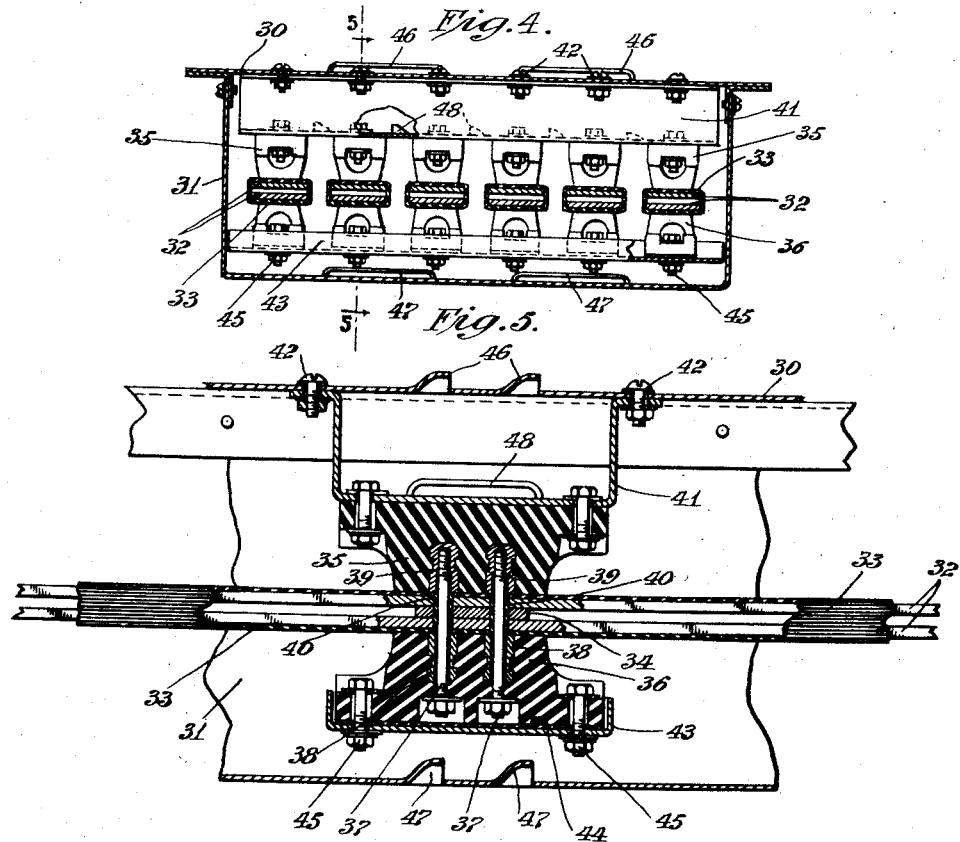

Patented Nov. 18, 1941

2,263,211

UNITED STATES PATENT OFFICE 2,263,211

ELECTRIC POWER DISTRIBUTION SYSTEM

Frank Harvey, Cincinnati, Ohio, and Elmer T. Carlson, Fort Mitchell, Ky., assignors to The Trumbull Electric Manufacturing Company, Plainville, Conn., a corporation of Connecticut Application October 10, 1938, Serial No. 234,170

3 Claims. (Cl. 174—99)

This invention relates generally to electric distribution systems employing bus bars and more particularly to means for supporting said bars.

A special object of the invention is to support and insulate the bus bar conductors to provide great mechanical strength against the stresses of a high amperage short circuit.

Another object is to support the bus bars in spaced relationship, the bus bars, supports and spacers forming a unitary structure capable of being mounted and demounted in bus bar conduits of ordinary construction.

A further object is to prevent elongated bus bars in power distribution systems from twisting or lateral bulging movement.

Still another object is to provide a bus bar supporting structure of this kind that will withstand stresses caused by short circuiting and the like.

Yet another object is to provide a bus bar supporting structure of this kind with a maximum of dielectric strength.

In carrying out our invention, we may provide a conduit consisting of a cover or top piece and a deep removable channel member. Depending from the cover are a number of bus bar supporting units including spaced insulating blocks adapted to receive the bus bars therebetween and fastened to each other individually or in pairs, pairs of the blocks being secured to a transverse bar in the conduit, which bar is suitably fastened to the conduit.

In the drawings, Figure 1 is a partial side view of a conduit embodying one form of our improvements, parts being broken away and parts being shown in section.

Fig. 4 is a cross sectional view through a conduit embodying another form of our invention.

Fig. 5 is a sectional view on the plane of the line 5—5 of Fig. 4.

Figure 1:
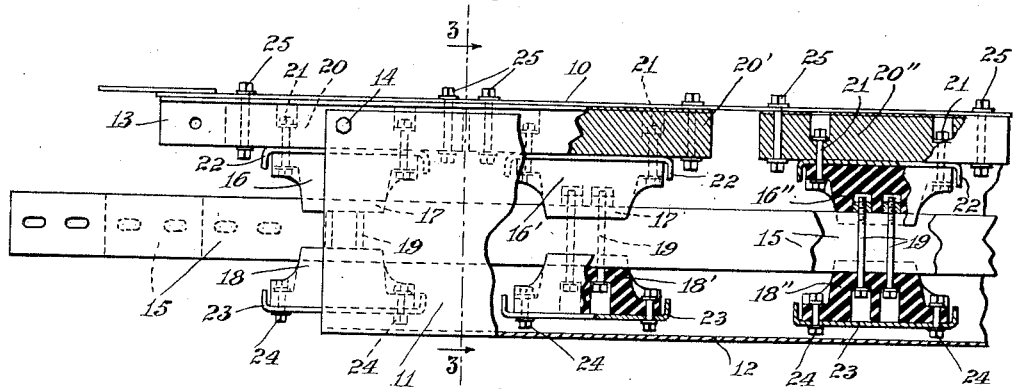

In the form shown in the drawings, the housing or conduit consists of a top plate or cover 10 and a channel-like lower portion having sides 11, 11 and a connecting bottom plate 12. This lower portion is secured to the top plate for instance by means of angle irons 13. The horizontal flanges of these irons may be welded or otherwise secured to the outer edge of the cover or top plate, and the side flanges of the angle irons may afford means of connection for the side walls 11, 11, which may be detachably fastened by screws or bolts 14.

Figure 2:
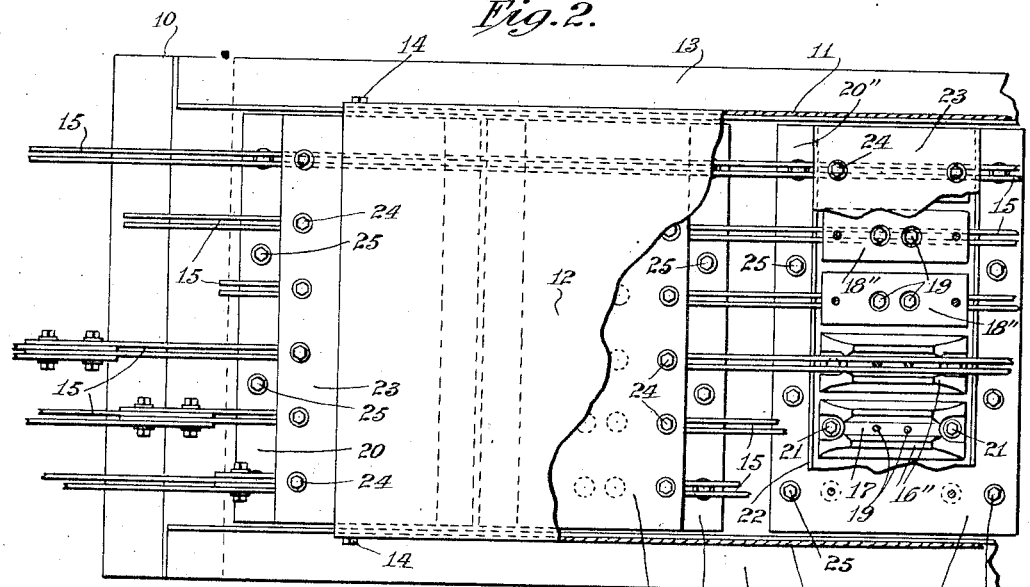
Fig. 2 is a view looking upwardly at Fig. 1, parts being broken away.
Figure 3:
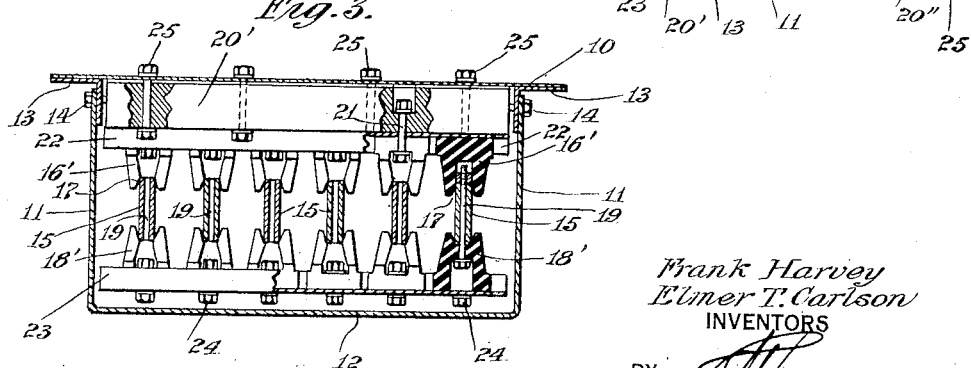
Fig. 3 is a sectional view on the plane of the line 3—3 of Fig. 1.

The bus bars 15 may be of any suitable type and in the present form of Figs. 1 to 3, each bus bar consists of two strips arranged side by side but spaced apart. These bus bars are supported at intervals by blocks such as 16, 16', and 16" formed of insulating material. Each block has a groove 17 in which the upper edge of the supported bus bar is positioned. Beneath each upper block is a companion block, such as 18, 18' and 18" which may be substantially like the upper block. One or more bolts 19 passes upwardly through each lower block and screws into an insert in the upper block by means of which a bus bar is securely clamped between the upper and lower blocks, respectively.

The upper blocks are arranged in rows and all the blocks of a row are secured to a transverse bar, such as 20, 20' and 20" by bolts or screws 21 usually two in each block. The transverse bars may be of insulating material or wood; or transverse metal channels 22 may be used, in lieu thereof or additionally thereto.

The blocks of each transverse row of lower blocks are also secured or connected together for instance by transverse bars 23 of metal, wood or insulating material and bolts or screws 24.

Each of the upper transverse bars 20, 20' and 20" is secured to the top plate 10 by means of bolts or screws 25.

Preferably the cross bars 23 which connect the rows of lower blocks are formed separately from the bottom wall of the housing so that the housing can be removed without disturbing the supports for the bus bars. It is desirable however to have the ends of the transverse bars 20, 23, etc., extend to or close to the side walls of the housing so as to serve as protecting interior abutments to prevent relative displacement of the parts.

Such a construction affords great strength, indeed sufficient to withstand a short circuit stress of 60,000 R. M. S. amperes. Very little strain however will come on the housing itself.

Although the bus bars and supports are tied together both above and below the bus bars, the joints between the bus bars and the connections to the supports are easily accessible by merely removing the deep channel part of the housing. This is so because each group of supports is tied together by a cross piece which is isolated and separate from all the other groups of bus bar supports.

In the form shown in Figs. 4 and 5, the conduit is formed similar to the first form having a top plate 30 and a channel portion 31 detachably secured to flanges depending from the top plate.

In this case, the bus bars 32, 32 are arranged flatwise or horizontally instead of vertically or on edge. Each bar may be surrounded with insulation 33 to increase the dielectric strength of the construction while keeping its size at a minimum. Each bus bar has two strips spaced by spacers 34 and clamped between an upper block 35 and a lower block 36 by bolts or screws 37 which pass through inserts 38 into threaded inserts 39. Insulating tubes 40 may surround the bolt shanks within the bus bars and spacers. The blocks 35 of each row of upper blocks are secured to a transverse bar or connector 41 which may be in the form of a metallic channel secured to the top plate 30 by means of bolts 42. The blocks of each row of lower blocks 36 are connected by a transverse member 43 which may be in the form of a metallic channel with an interposed layer 44 of insulation if desired and secured together by bolts 45.

The housing may be provided with ventilating louvres 46 and 47 and the transverse connector 41 may also have louvres 48 if desired.

It will be apparent that the bus bars, the insulating blocks between which the bus bars are secured and the cross bars on which the insulating blocks are mounted are secured together substantially as a unit and that the length of the cross bars is such as to just fit freely between the side walls of the conduit in such a manner as to effectually prevent any warping or lateral bulging movement of the respective bus bars and maintain the bus bars in a substantially straight line.

It should be understood that other changes in details may be made within the scope of our invention as expressed in the claims.

We claim:

1. A bus bar supporting structure including a longitudinally extending enclosure having a plurality of walls, with at least one wall fashioned as a removable cover, a plurality of bus bars within the enclosure, said bus bar supporting structure including a transverse group of seats and insulating means for engaging and holding each of the bus bars in spaced, insulated relation from the others and from the enclosure, means for securing said seats to a wall of the enclosure opposite the removable cover, a transverse group of separate clamps matching said group of seats for individually engaging the bus bars, a clamping bolt for drawing each clamp individually toward one in said group of seats to support each bus bar removably between a clamp and a seat, a transverse bar for said group of clamps, and means including insulation removably securing said transverse bar to each clamp in its group to hold each of said clamps in spaced, insulated relation from the others and from the transverse bar, the ends of the transverse bar extending to points beyond the clamps and close to the adjacent walls of the enclosure, thereby maintaining said clamps in spaced, insulated relation to said enclosure, said cover being removable without disturbing said bus bars or said transverse bar and each of said clamping bolts being completely removable so as to allow the removal of the bus bar held thereby without loosening any other bus bar.

2. In a bus duct system of power distribution, a duct having an upper portion and a lower portion, a number of bus bars enclosed in the duct, means secured to the upper portion of the duct for spacing the upper edges of the bus bars apart laterally and insulating them from each other, means for individually securing said bus bars to said spacing and insulating means, means for connecting said securing means together and spacing the lower edges of said bus bars apart laterally from each other, said latter connecting means having parts projecting laterally of the bus bars to limit the lateral buckling of the bus bars and prevent them from engaging the inner walls of the duct, and means for detachably securing the lower portion of the duct to the upper portion independently of the bus bars and independently of the spacing and connecting means so that the lower portion of the duct can be removed without disturbing the bus bars or their supports, each of said securing means securing a single bus bar to said spacing and insulating means being wholly removable without loosening any other bus bar, whereby each bus bar may be removed individually.

3. A bus bar supporting structure including a longitudinally extending enclosure having a plurality of walls, with at least one wall fashioned as a removable cover, a plurality of bus bars within the enclosure, said bus bar supporting structure including a transverse group of seats and insulating means for engaging and holding each of the bus bars in spaced, insulated relation from the others and from the enclosure, means for securing said seats to a wall of the enclosure opposite the removable cover, a transverse bar located opposite said transverse group of seats, a group of discrete clamps located upon said transverse bar so as each to be opposite a corresponding seat, discrete means for mounting each individual clamp upon said transverse bar, each clamp being capable of removal without affecting the mounting of any other clamp mounted upon said transverse bar, whereby each bus bar is held in position and may be removed as a discrete unit, said transverse bar acting to space the several clamps and consequently the several bus bars and to hold them in position against electrical and mechanical strains tending to displace the bus bars and also acting to shield them from contact with the enclosure walls, and said cover being removable without disturbing said bus bars or said transverse bar.

FRANK HARVEY.
ELMER T. CARLSON.